US008326040B2

(12) United States Patent
Zhang et al.

(10) Patent No.: US 8,326,040 B2
(45) Date of Patent: Dec. 4, 2012

(54) COMBINER FOR IMPROVING HANDWRITING RECOGNITION

(75) Inventors: Qi Zhang, Redmond, WA (US); Ahmad A. Abdulkader, Woodinville, WA (US); Michael T. Black, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 88 days.

(21) Appl. No.: 12/880,121

(22) Filed: Sep. 12, 2010

(65) Prior Publication Data

US 2011/0007963 A1    Jan. 13, 2011

Related U.S. Application Data

(62) Division of application No. 11/443,762, filed on May 31, 2006, now Pat. No. 7,817,857.

(51) Int. Cl.
*G06K 9/18* (2006.01)
*G06K 9/00* (2006.01)
*G06K 9/62* (2006.01)
*G06K 9/68* (2006.01)

(52) U.S. Cl. ........ 382/186; 382/155; 382/156; 382/158; 382/159; 382/161; 382/181; 382/185; 382/187; 382/209; 382/218; 382/224; 382/227

(58) Field of Classification Search .......................... None
See application file for complete search history.

(56) References Cited

U.S. PATENT DOCUMENTS

| | | | |
|---|---|---|---|
| 4,024,500 A | 5/1977 | Herbst et al. | |
| 4,760,604 A | 7/1988 | Cooper et al. | |
| 5,315,667 A | 5/1994 | Fujisaka et al. | |
| 5,319,721 A | 6/1994 | Chefalas et al. | |
| 5,438,631 A | 8/1995 | Dai | |
| 5,832,108 A * | 11/1998 | Fukita et al. | 382/159 |
| 5,854,855 A | 12/1998 | Errico et al. | |

(Continued)

FOREIGN PATENT DOCUMENTS

CN   1118902 A   3/1996

(Continued)

OTHER PUBLICATIONS

Aksela ("Handwritten Character Recognition: a palm-top implementation and adaptive committee experiments", Helsinki University of Technology—thesis, 2000, p. 90-96).

(Continued)

*Primary Examiner* — Tom Y Lu
*Assistant Examiner* — Thomas Conway
(74) *Attorney, Agent, or Firm* — Capitol City TechLaw; Richard C. Irving (57) ABSTRACT

Various technologies and techniques are disclosed that improve handwriting recognition operations. Handwritten input is received in training mode and run through several base recognizers to generate several alternate lists. The alternate lists are unioned together into a combined alternate list. If the correct result is in the combined list, each correct/incorrect alternate pair is used to generate training patterns. The weights associated with the alternate pairs are stored. At runtime, the combined alternate list is generated just as training time. The trained comparator-net can be used to compare any two alternates in the combined list. A template matching base recognizer is used with one or more neural network base recognizers to improve recognition operations. The system provides comparator-net and reorder-net processes trained on print and cursive data, and ones that have been trained on cursive-only data. The respective comparator-net and reorder-net processes are used accordingly.

20 Claims, 11 Drawing Sheets

U.S. PATENT DOCUMENTS

| | | | |
|---|---|---|---|
| 6,111,985 | A | 8/2000 | Hullender et al. |
| 6,393,464 | B1 | 5/2002 | Dieterman |
| 6,603,881 | B2 | 8/2003 | Perrone et al. |
| 7,031,530 | B2 | 4/2006 | Driggs et al. |
| 2004/0148577 | A1 | 7/2004 | Xu et al. |
| 2005/0005240 | A1 | 1/2005 | Reynar et al. |
| 2005/0069203 | A1 | 3/2005 | Khomo |
| 2005/0100214 | A1 | 5/2005 | Zhang et al. |
| 2005/0100217 | A1 | 5/2005 | Abdulkader et al. |
| 2005/0251744 | A1 | 11/2005 | Brill et al. |
| 2006/0274943 | A1 | 12/2006 | Abdulkader et al. |
| 2007/0005537 | A1 | 1/2007 | Abdulkader et al. |

FOREIGN PATENT DOCUMENTS

| | | |
|---|---|---|
| JP | 11-167606 A | 6/1999 |

OTHER PUBLICATIONS

Zimmerman et al. ("Parsing N-best lists of handwritten sentences", Proceedings ICDAR, 2003, p. 1-5).
Bunke ("Recognition of cursive roman handwriting—past, present and future", Proceedings ICDAR, 2003, p. 1-12).
International Search Report PCT/US2007/010872, Dated Oct. 30, 2007, pp. 1-7.
Senior, et al., "An Off-Line Cursive Handwriting Recognition System", Mar. 1998, vol. No. 20, http://www.cs.berkeley.edu/~daf/appsem/Handwriting/papers/00667887.pdf.
Chen, et al., "Freestyle Handwriting Recognition", Nov. 8, 2002, http://www.ceresoft.com/freestyle.html.
"CalliGrapher 8.2 for Pocket PCs", No date available, http://www.phatware.com/calligrapher/index.html.
"European Search Report", Mailed Date: Mar. 14, 2011, Application No. EP/07776763, Filed Date: Mar. 14, 2011, pp. 11. (MS# 316744.04).
Abdulkader, et al., "Comparative Classifier Aggregation", 18th International Conference on Pattern Recognition, vol. 3, Aug. 20, 2006, pp. 4.
Anisimovich, et al., "Using combination of structural, feature and raster classifiers for recognition of handprinted.characters", Proceedings of the Fourth International Conference on Document Analysis and Recognition, vol. 2, Aug. 18, 1997, pp. 881-885.
Alam, et al., "A pair-wise decision fusion framework: recognition of human faces", Proceedings of the Sixth International Conference of Information Fusion, vol. 2, Jul. 8, 2003, pp. 1484-1489.
"Hybrid optical character recognition system with neural network and template matching recognition methods", IBM Technical disclosure bulletin, vol. 37, Issue 11, Nov., 1994, p. 275.
"Optical character recognition", Retrieved at << http://en.wikipedia.org/w/index.php?title=Optical_character_recognition&oldid=55051814>>, May 25, 2006, pp. 4.
Kuncheva, Ludmila I., "Combining pattern classifiers: Methods and algorithms", Jan. 1, 2004, pp. 360.
Ho, et al., "Decision combination in multiple classifier systems", IEEE Transactions on Pattern Analysis and Machine Intelligence, vol. 16, Issue 01, Jan. 1, 1994, pp. 67-75.
Hastie, et al., "Classification by pairwise coupling", Proceedings of the 1997 conference on Advances in neural information processing systems, vol. 10, Jan. 1, 1998, pp. 1-38.
Furnkranz, et al., "Pairwise preference learning and ranking", Proceedings of the 14th European Conference on Machine Learning, 2003, pp. 12.
Burges, et al., "Learning to Rank using Gradient Descent", Proceedings of the 22nd international conference on Machine learning, Aug. 7, 2005, pp. 89-96.
Cohen, et al., "Learning to order things", Journal of Artificial Intelligence Research, May, 1999, pp. 243-270.
Paragon Software Group, "Handwriting", retrieved from http://www.penreader.com/technologies/Handwriting. html, printed Mar. 22, 2006.

* cited by examiner

COMBINER FOR IMPROVING HANDWRITING RECOGNITION

This application is a divisional application of co-pending U.S. patent application Ser. No. 11/443,762, filed in the U.S. Patent and Trademark Office on May 31, 2006.

BACKGROUND

Pen-enabled devices such as tablet pc's and personal digital assistants often use one or more types of handwriting recognizers to allow users to enter data using the pen. Handwriting recognizers analyze the user's handwriting according to a series of classifiers to determine the most likely match. It is often difficult to achieve good handwriting recognition results for cursive handwriting due to the large number of inter and intra person variations (or writing styles) to write the same character. For example, a N stroke character can be written in 1–N strokes (potentially yielding $2^N$ writings), and the way strokes are connected can vary drastically from person to person and from character to character. In addition, East Asian languages usually have the order of 10,000 characters (codepoints, or classes), which further complicates the problem. Difficulty can also arise from the uneven data distribution (such as when there are much more print training samples than cursive samples), which results in a limited number of cursive samples being present in prototype databases as compared to the number of print samples. Another difficulty can arise when using neural networks for character recognition. Neural networks usually do not scale well to thousands of classes or to characters. Trying to support all these characters in neural network recognizers can drastically degrade system accuracy.

SUMMARY

Various technologies and techniques are disclosed that improve handwriting recognition operations. Handwritten input is received in training mode and run through several base recognizers to generate several alternate lists. The alternate lists are unioned together to generate a new combined alternate list (such as with N alternates). If the correct result is present in the combined alternate list, each of the correct/incorrect alternate pairs (N–1 of them in total) in the new combined alternate list are used to generate training patterns to train a recognition system (called comparator-net) that can learn which alternate is correct (i.e. a system that can be used to compare two alternates). The weights associated with the alternate pairs are stored for use in recognition operations.

At runtime, the combined alternate list is generated in the same way as training time. The trained comparator-net can be used to compare any two alternates in the combined alternate list. In one implementation, a sorting function (or max function) is used together with the comparator-net to reorder the combined alternate list to improve accuracy. In one implementation, a template matching base recognizer is used with one or more neural network base recognizers to improve recognition operations. The system provides access to comparator-net and reorder-net processes that have been trained on print and cursive data, as well as ones that have been trained on cursive-only data. The respective comparator-net and reorder-net processes are then used depending on whether handwritten input is print or cursive.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves handwriting recognition, but the system also serves other purposes in addition to these. In one implementation, one or more of the techniques described herein can be implemented as features within a handwriting recognition program, or from any other type of program or service that is used to train handwriting recognizers or to recognize handwritten input.

Figure 1:
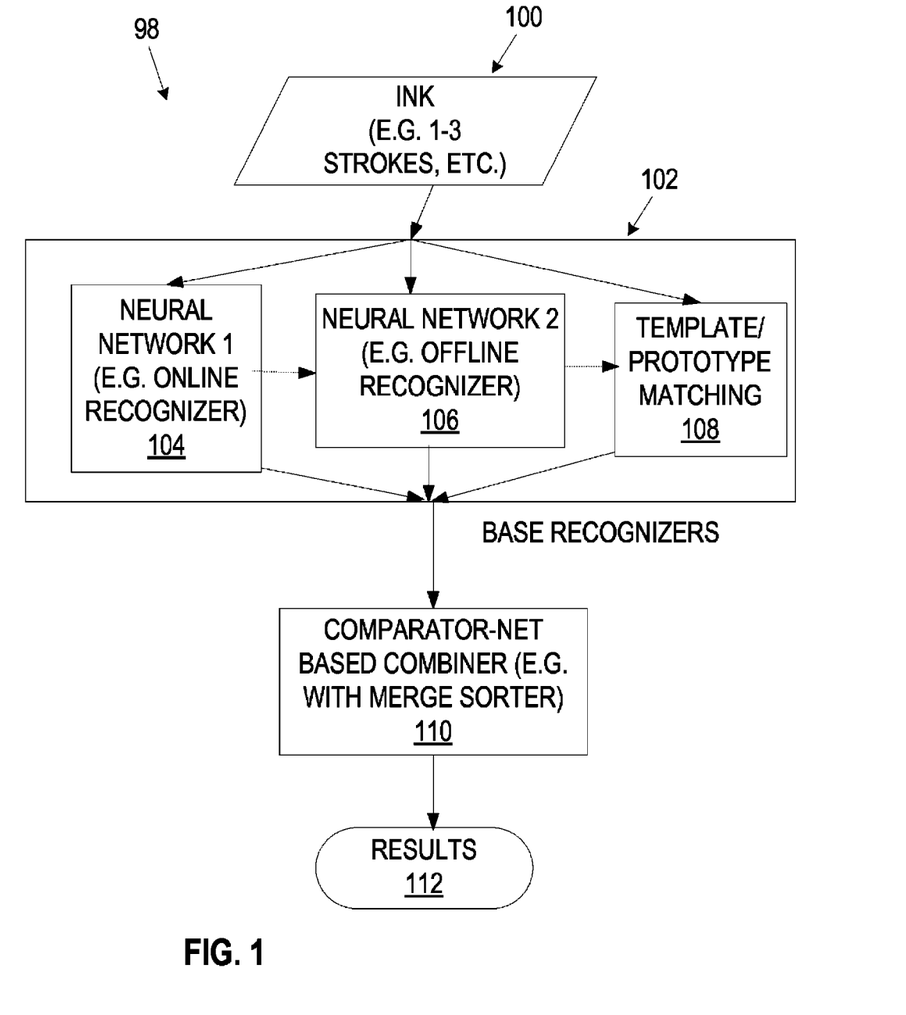
FIG. 1 is a diagrammatic view of a system of one implementation illustrating a comparator-net based combiner for use in recognition operations.

FIG. 1 is a diagrammatic view of a system 98 of one implementation illustrating a comparator-net based combiner for use in recognition operations. System 98 receives ink 100 (e.g. handwritten input) from a user, such as in 1-3 strokes. Ink 100 is run through multiple base handwriting recognizers 102, such as neural network recognizer 104, neural network recognizer 106, and template/prototype matching recognizer 108. In one implementation, neural network recognizer 104 is an online recognizer, and neural network recognizer 106 is an offline recognizer. In one implementation, prototype/template matching recognizer 108 compares the ink segments to ink samples in a database to determine a list of probabilities of the most likely results. Other variations and quantities of recognizers could also be used, including fewer or more recognizers of one or more types than discussed here. After ink 100 is run through base handwriting recognizers 102, the alternate lists from each process are merged into a new alternate list. An alternate list is a list of characters and corresponding scores that indicate how likely the respective character is to be the correct result. In one implementation of the systems herein, there is an upper limit on the length of the alternate lists. The new alternate list is used by comparator-net based combiner 110 to perform a recognition operation. The results 112 are then provided. System 98 will be described in further detail in FIGS. 2-3.

Figure 2:
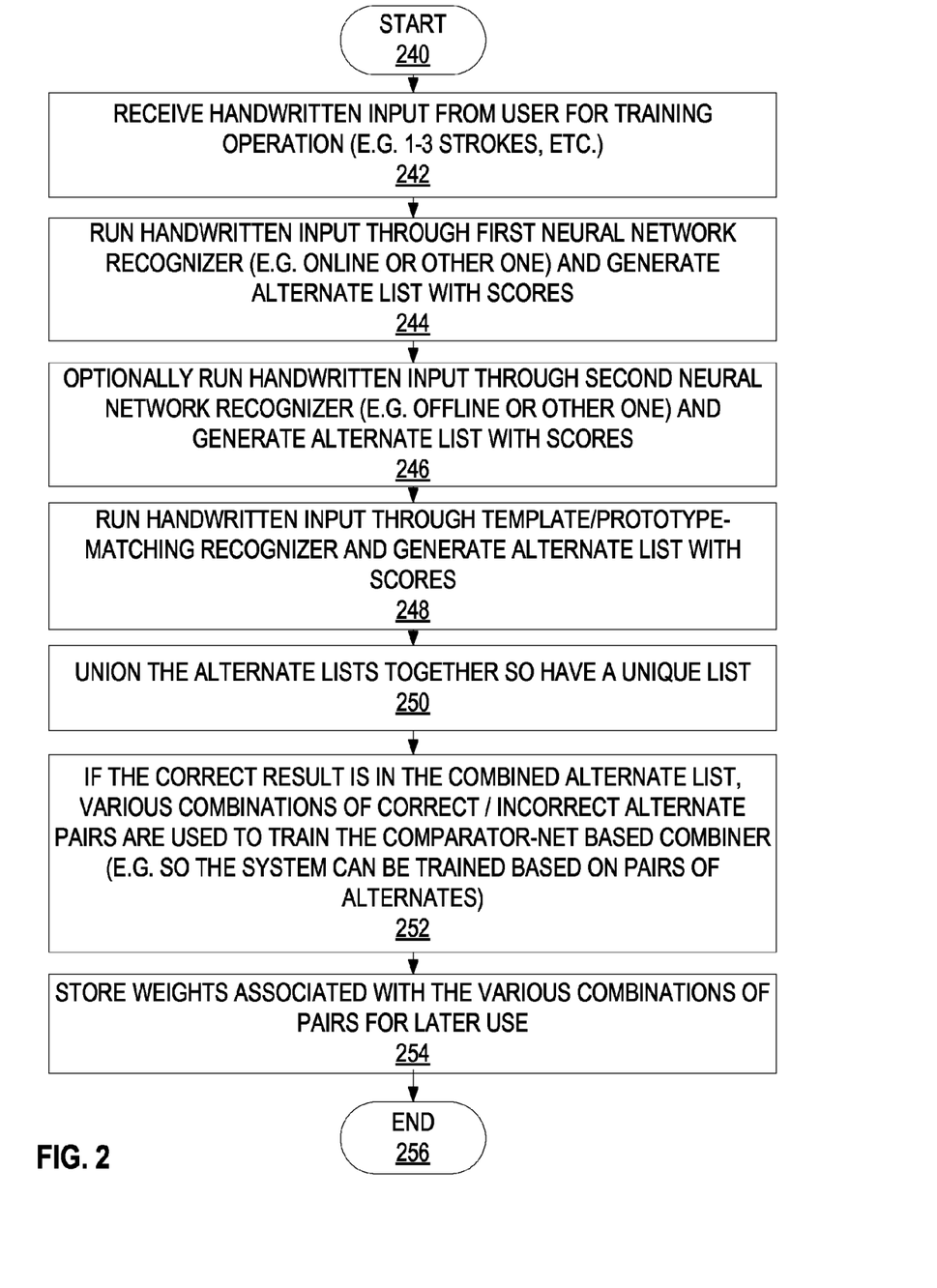
FIG. 2 is a process flow diagram for one implementation of the system of FIG. 1 illustrating the stages involved in performing a handwriting recognition training operation to produce the comparator-net based combiner.
Figure 3:
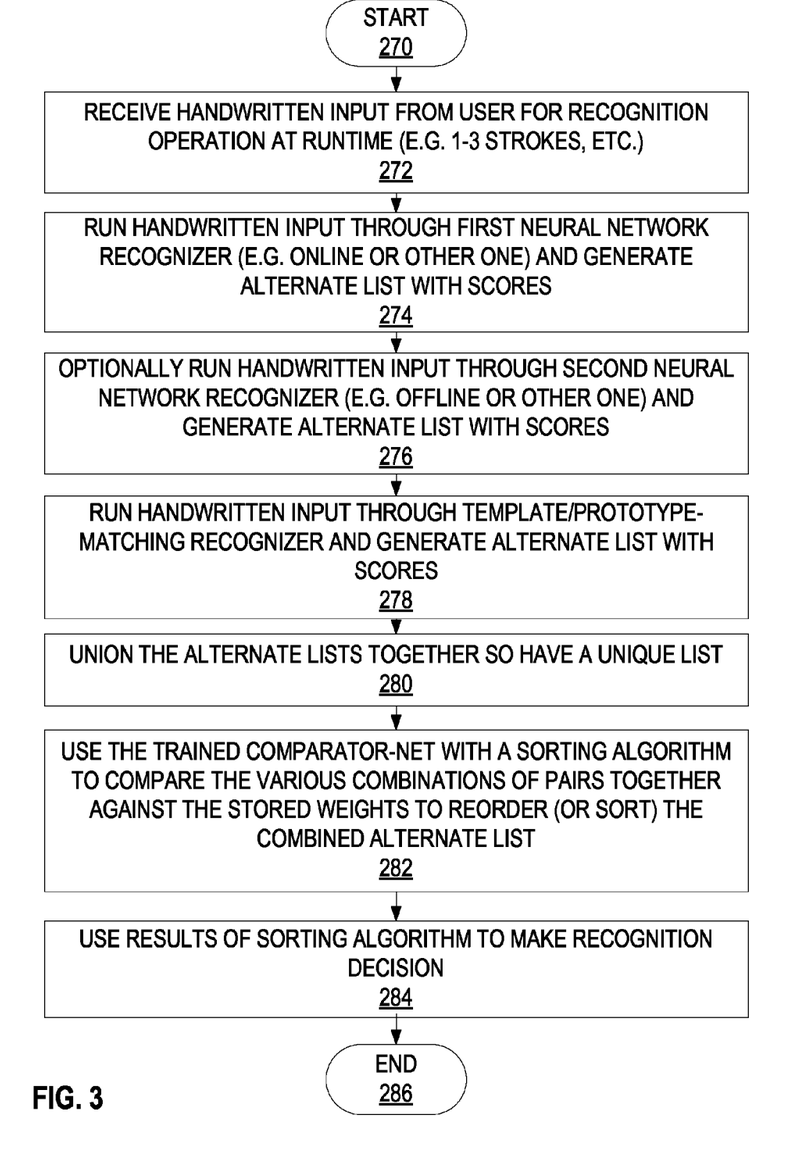
FIG. 3 is a process flow diagram for one implementation of the system of FIG. 1 illustrating the stages involved in performing a handwriting recognition operation using a comparator-net based combiner.

Turning now to FIGS. 2-3 with continued reference to FIG. 1, the stages for implementing one or more implementations of recognition system 98 are described in further detail. FIG. 2 is a process flow diagram for one implementation of system 98 of FIG. 1 illustrating the stages involved in performing a handwriting recognition training operation to produce the comparator-net based combiner 110. In one form, the process of FIG. 2 is at least partially implemented in the operating logic of computing device 600 (described in FIG. 11).

The procedure begins at start point 240 with receiving handwritten input from a user for a training operation (stage 242). In one implementation, the handwritten input (e.g. ink 100) is from 1-3 strokes (e.g. less than 4 strokes). The handwritten input is run through a first neural network recognizer 104 (e.g. online or other one) to generate an alternate list with scores (stage 244). The handwritten input is run through a second neural network recognizer 106 (e.g. offline or other one) to generate another alternate list with scores (stage 246). The handwritten input is also run through template/prototype-matching recognizer 108 to generate another alternate list with scores (stage 248). In one implementation, these recognitions with the base recognizers are unconstrained. As described in further detail in FIG. 7, in another implementation, the alternate list from one recognizer is used as a constraint for the subsequent recognition operation with next recognizers. This alternate implementation is illustrated on FIG. 1 with dashes flowing from recognizers 104 to 106 to 108.

The alternate lists are unioned together so there is a unique list (stage 250). For example, suppose you have the following alternate lists:

Alternate List 1: [A, B, C]
Alternate List 2: [B, C, E]
Alternate List 3: [C, E, F]

The combined alternate list will include: [A, B, C, E, F], which is a unique list of all the ones included in the original alternate lists. If the correct result (suppose C) is in the combined alternate list, various combinations of correct/incorrect alternate pairs are then used to train the comparator-net based combiner 110 (stage 252). If the combined alternate list does not contain a correct result, no training patterns are generated from this particular ink sample for comparator-net training.

Since a correct result is known (in training mode), the system can be trained based on pairs of alternates (stage 252). Continuing with the prior example, comparisons will be made between A and C, B and C, C and E, and C and F. The weights associated with the various combinations of pairs are stored in a data store for later use in recognition operations (stage 254). The process ends at end point 256.

FIG. 3 is a process flow diagram for one implementation of system 98 of FIG. 1 illustrating the stages involved in performing a runtime handwriting recognition operation using a comparator-net based combiner. In one form, the process of FIG. 3 is at least partially implemented in the operating logic of computing device 600 (described in FIG. 11). The procedure begins at start point 270 with receiving handwritten input (ink 100) from a user for a runtime recognition operation (stage 272). In one implementation, the handwritten input contains 1 to 3 strokes (e.g. less than 4 strokes). Handwritten input 100 is run through the first neural network recognizer 104 (e.g. online or other one) to generate an alternate list with scores (stage 274). Handwritten input 100 is run through second neural network recognizer 106 (e.g. offline or other one) to generate another alternate list with scores (stage 276). Handwritten input 100 is run through template/prototype-matching recognizer to generate another alternate list with scores (stage 278). The alternate lists are unioned together so there is a unique list of alternates (stage 280). The trained comparator-net is used with a sorting algorithm to compare the various combinations for pairs together against the stored weights to reorder (or sort) the combined alternate list (stage 282). The results of this process are used to make a recognition decision (stage 284). The process ends at end point 286.

Figure 4:
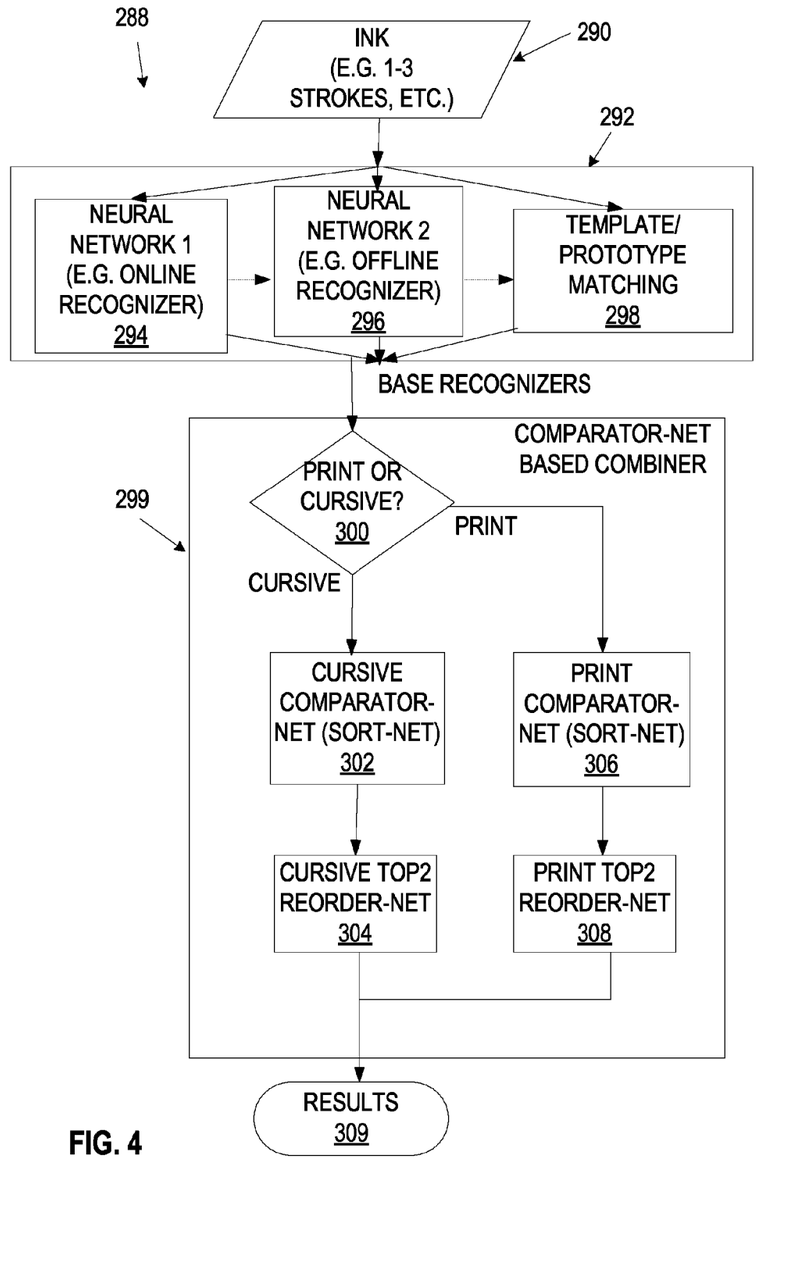
FIG. 4 is a diagrammatic view of a system of one implementation illustrating a comparator-net based and reorder-net combiner for use in recognition operations.

FIG. 4 is a diagrammatic view of a system 288 of another implementation that illustrates a comparator-net and reorder-net based combiner for use in recognition operations. System 288 receives ink 290 (e.g. handwritten input) from a user, such as in 1-3 strokes. Ink 290 is run through multiple base handwriting recognizers 292, such as neural network recognizer 294, neural network recognizer 296, and template/prototype matching recognizer 298. In one implementation, neural network recognizer 294 is an online recognizer, and neural network recognizer 296 is an offline recognizer. Other variations and quantities of recognizers could also be used, including fewer or more recognizers of one or more types than discussed here. After ink 290 is run through base handwriting recognizers 292, the alternate lists from each process are merged into a new alternate list. The new alternate list is used by comparator-net based combiner 299 to perform a recognition operation. Depending on whether the ink is print or cursive (decision point 300), corresponding comparator-net and reorder-net processes are used for making a recognition decision. For example, if the input is cursive, then cursive comparator-net (sort-net) 302 and cursive top2 reorder-net 304 processes are executed. These cursive processes use cursive-only data as part of the process. If the input is print, then print comparator-net (sort-net) 302 and print top2 reorder-net 308 processes are executed. These print processes use both print and cursive data as part of the process. The results 309 are then provided. System 288 will be described in further detail in FIGS. 5-6.

Figure 5:
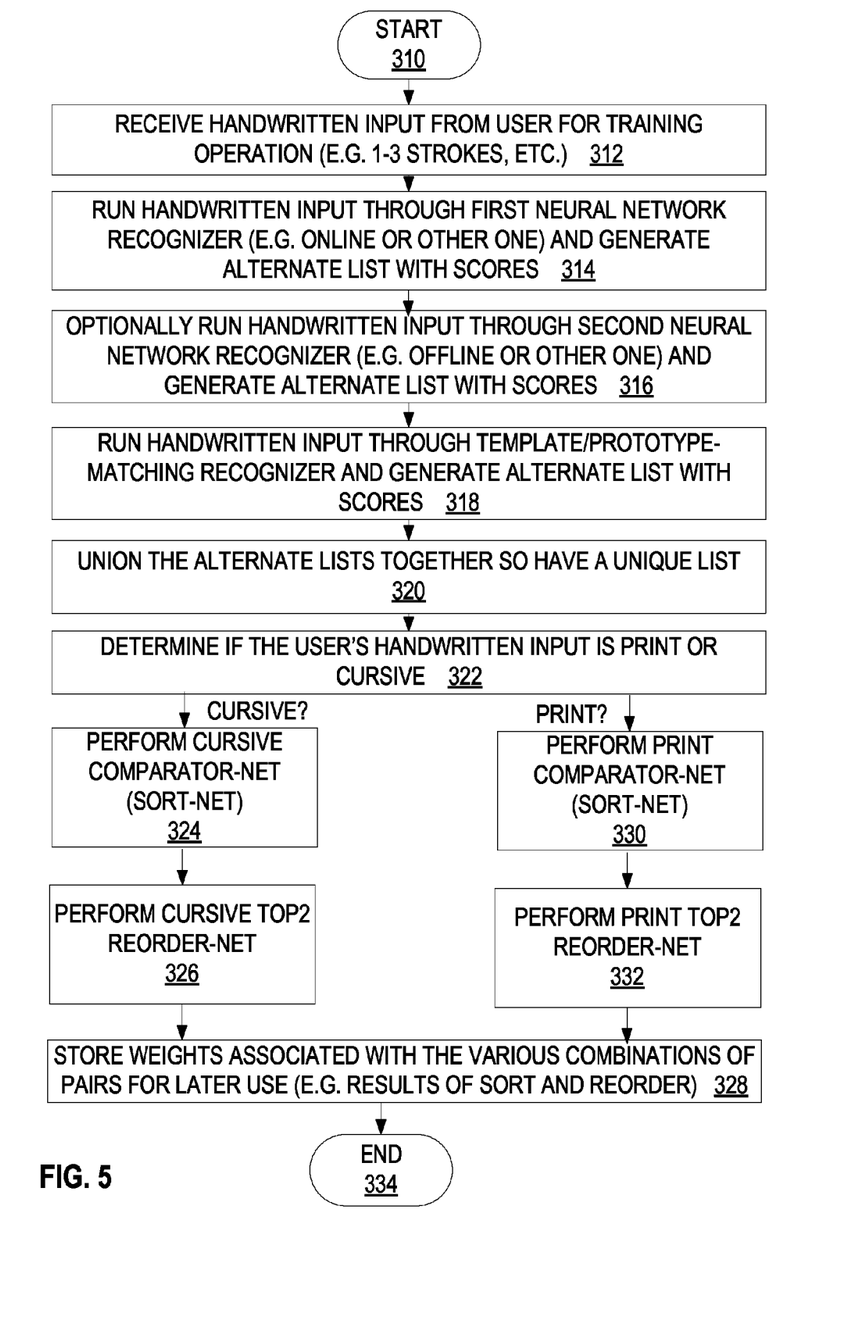
FIG. 5 is a process flow diagram for one implementation of the system of FIG. 4 illustrating the stages involved in performing a handwriting recognition training operation to produce a comparator-net and reorder-net.
Figure 6:
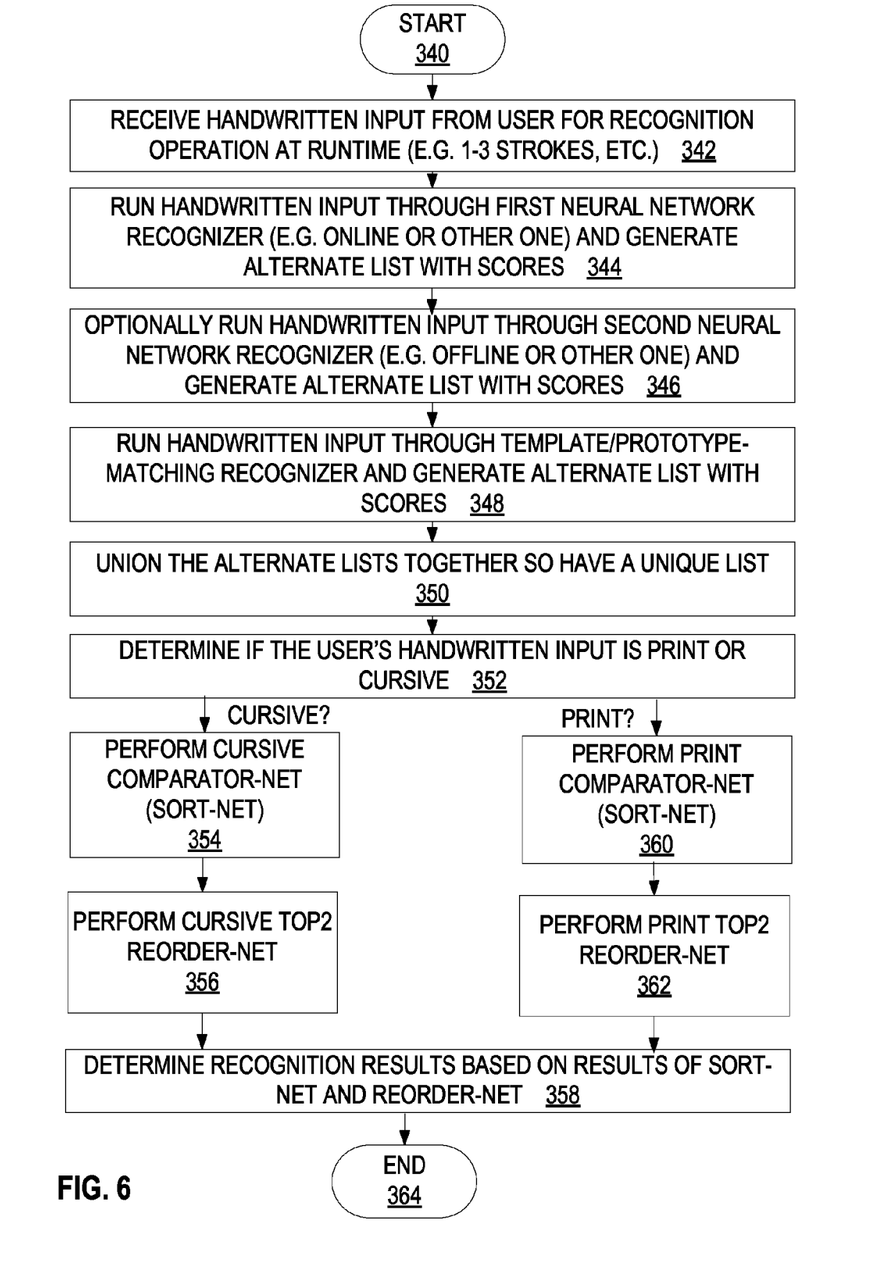
FIG. 6 is a process flow diagram for one implementation of the system of FIG. 4 that illustrates the stages involved in performing a handwriting recognition operation using a comparator-net and reorder-net process.

Turning now to FIGS. 5-6 with continued reference to FIG. 4, the stages for implementing one or more implementations of recognition system 288 are described in further detail. FIG. 5 is a process flow diagram for one implementation of system 288 of FIG. 4 illustrating the stages involved in performing a handwriting recognition training operation to produce a comparator-net and reorder-net. In one form, the process of FIG.

Figure 11:
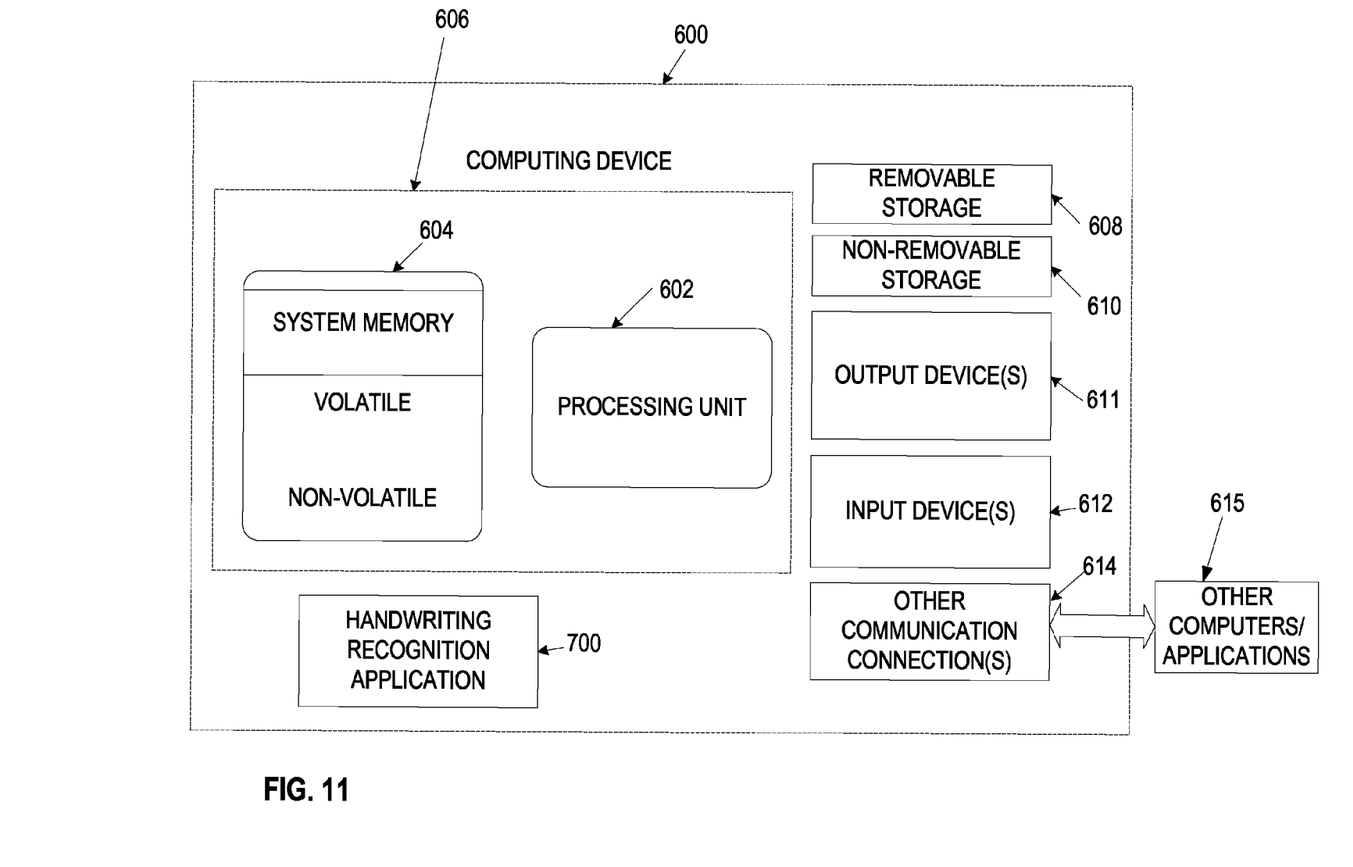
FIG. 11 is a diagrammatic view of a computer system of one implementation.

5 is at least partially implemented in the operating logic of computing device 600 (described in FIG. 11).

The procedure begins at start point 310 with receiving handwritten input from user for a training operation (stage 312). Handwritten input 290 is run through first neural network recognizer 294 (e.g. online or other one) to generate an alternate list with scores (stage 314). Handwritten input 290 is run through the second neural network recognizer 296 (e.g. offline or other one) to generate another alternate list with scores (stage 316). Handwritten input 290 is run through template/prototype-matching recognizer to generate another alternate list with scores (stage 318). The resulting alternate lists are unioned together so there is a unique list of alternates (stage 320). The system determines if the user's handwritten input is print or cursive (decision point 322). If the handwritten input is cursive, then the system performs the cursive comparator-net (sort-net) training process 302 (stage 324) and the cursive top2 reorder-net training process 304 (stage 326). If the handwritten input is print, then the system performs the print comparator-net (sort-net) training process 306 (stage 330) and the cursive top2 reorder-net training process 308 (stage 332). The difference between the print versus the cursive processes is the type of underlying data being used. The cursive processes contain cursive-only data, and the print processes contain both cursive and print data. Otherwise, the processes are performed the same as described in FIG. 2.

The appropriate comparator-net process uses the merged alternate list to compare pair of results to train comparator-net (stages 324 or 330). In one implementation, the top2 reorder-net is trained on the base of comparator-net. The reorder-net training process looks at the sorted (or reordered) combined alternate list after comparator-net. If the correct alternate is among the top two alternates, a training pattern comparing these two alternates is generated to train the reordering-net. The reordering net training process ignores samples where the correct alternate is not among the top 2 choices (of the sorted list). The weights associated with the various combinations of pairs are stored for later use in recognition operations (e.g. results of sort and reorder) (stage 328). The process ends at end point 334.

FIG. 6 is a process flow diagram for one implementation of the system 288 of FIG. 4 that illustrates the stages involved in performing a handwriting recognition operation using a comparator-net and reorder-net process. In one form, the process of FIG. 6 is at least partially implemented in the operating logic of computing device 600 (described in FIG. 11). The procedure begins at start point 340 with receiving handwritten input from user for a runtime recognition operation (stage 342). In one implementation, the handwritten input 290 is written in 1 to 3 strokes (e.g. less than 4 strokes). The handwritten input 290 is run through the first neural network recognizer 294 (e.g. online or other one) to generate an alternate list with scores (stage 344). The handwritten input 290 is run through second neural network recognizer 296 (e.g. offline or other one) to generate another alternate list with scores (stage 346). The handwritten input 290 is run through template/prototype-matching recognizer to generate another alternate list with scores (stage 348). The alternate lists are unioned together so there is a unique list of alternates (stage 350). The system determines if the user's handwritten input 290 is print or cursive (decision point 352).

If the handwritten input is cursive, then the system performs the cursive comparator-net (sort-net) process 302 (stage 354) and the cursive top2 reorder-net process 304 (stage 356). If the handwritten input is print, then the system performs the print comparator-net (sort-net) process 306 (stage 360) and the print top2 reorder-net process 308 (stage 362). The difference between the print versus the cursive processes is the type of underlying data being used for recognition. The cursive processes contain cursive-only data, and the print processes contain both cursive and print data. Otherwise, the processes performed are the same.

The appropriate comparator-net process uses a certain sorting routine (or algorithm) together with comparator-net (used as the comparing function in sorting) to reorder or sort the merged alternate list (stages 354 or 360). The appropriate reorder-net process compares the top 2 results after sorting with the comparator-net. Sometimes, the reorder-net flips the order of the top two results from the comparator-net operation to improve accuracy (stages 356 or 362). The process ends at end point 364.

Figure 7:
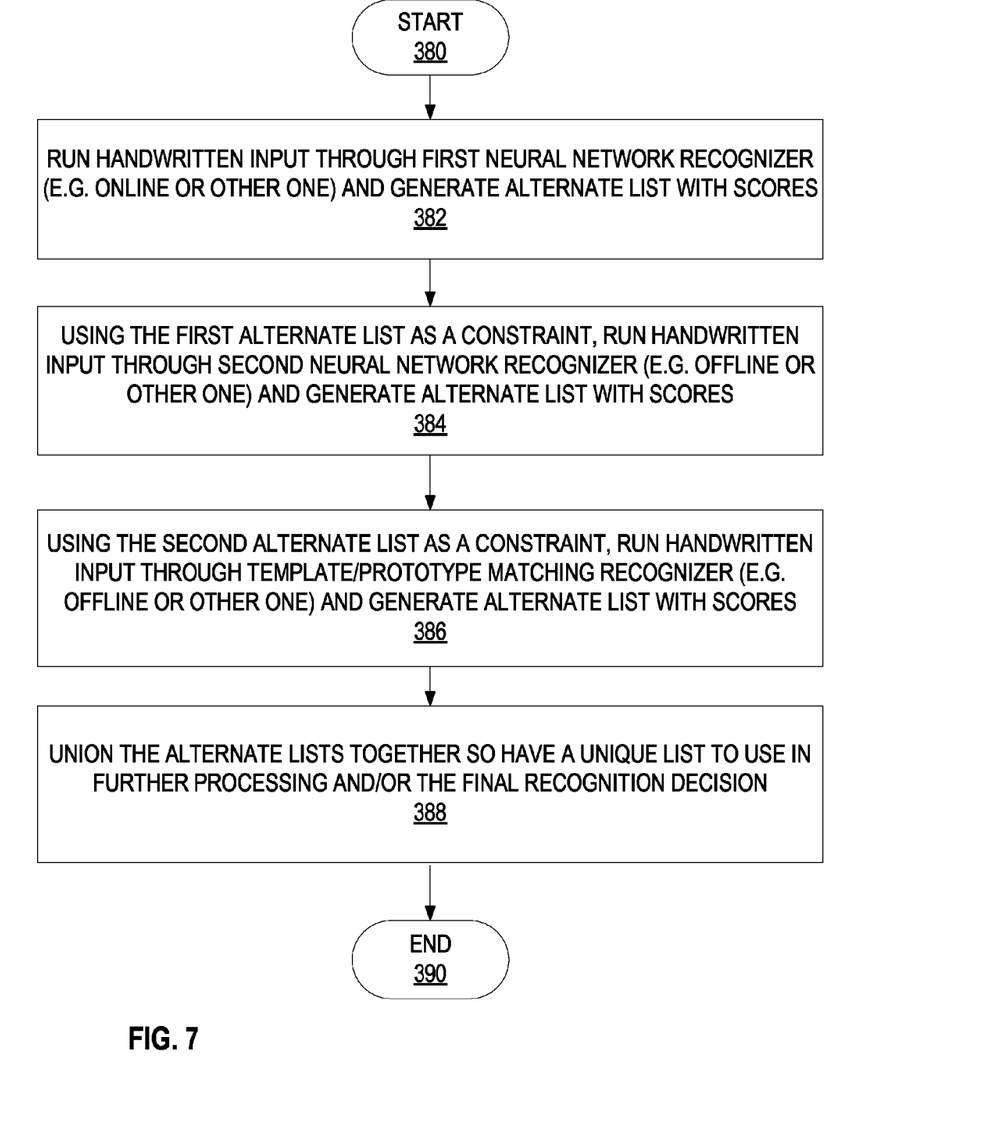
FIG. 7 is a process flow diagram for one implementation of the system of FIG. 1 and FIG. 4 that illustrates the stages involved in performing a recognition operation using constraints on the base recognizers.

FIG. 7 is a process flow diagram for one implementation of the system of FIG. 1 and FIG. 4 that illustrates the stages involved in performing a recognition operation using constraints on the base recognizers. In one form, the process of FIG. 7 is at least partially implemented in the operating logic of computing device 600 (described in FIG. 11). The procedure begins at start point 380 with running handwritten input (100 or 290) through first neural network recognizer (104 or 294) to generate an alternate list with scores (stage 382). Using the first alternate list as a constraint, the system runs handwritten input (100 or 290) through a second neural network recognizer (106 or 296) to generate another alternate list with scores (stage 384). Using the second alternate list as a constraint, the system runs handwritten input (100 or 290) through a template/prototype matching recognizer (108 or 298) to generate an alternate list with scores (stage 386). The alternate lists are unioned together to produce a unique alternate list to use in further processing and/or the final recognition decision (stage 388). The process ends at end point 390.

Figure 8:
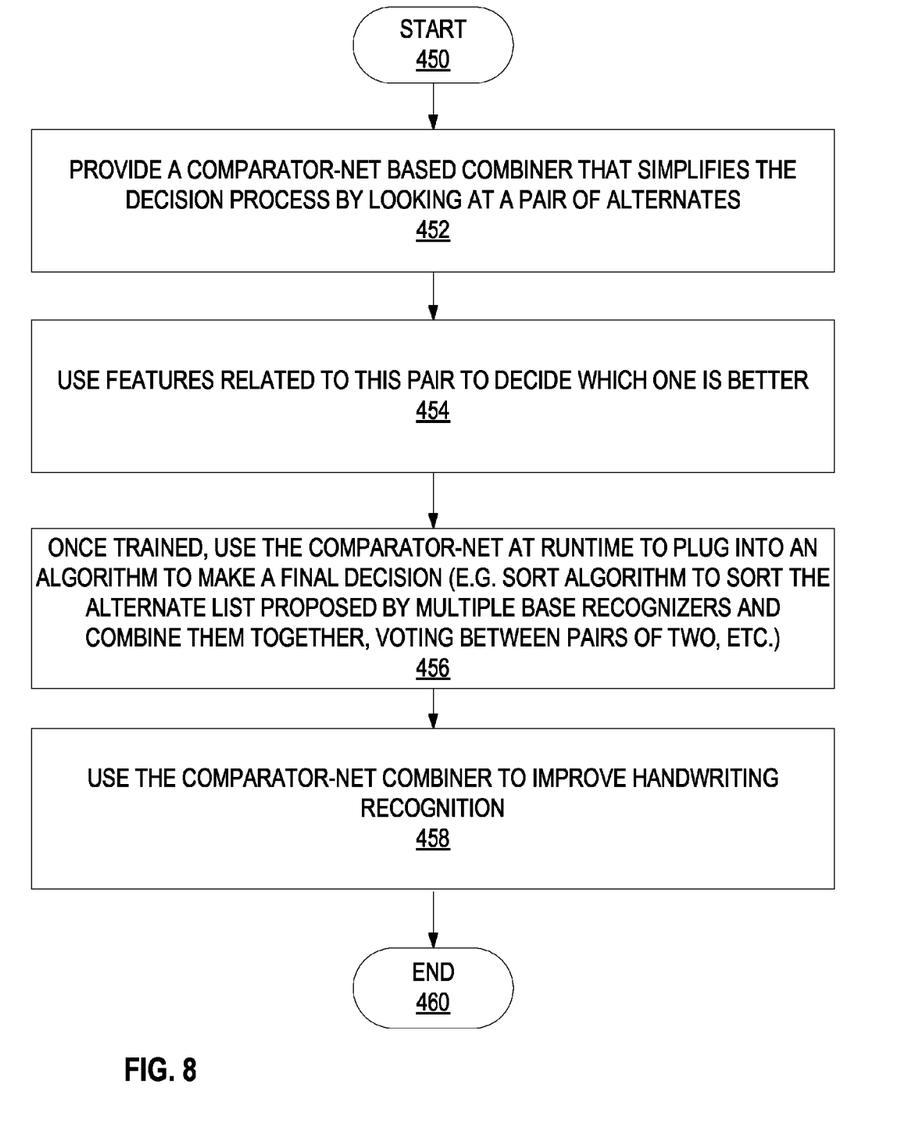
FIG. 8 is a process flow diagram for one implementation of the system of FIG. 1 and FIG. 4 that illustrates the stages involved in providing a comparator-net and reorder-net based combiner to improve handwriting recognition.

FIG. 8 is a process flow diagram for one implementation of the system of FIG. 1 and FIG. 4 that illustrates the stages involved in providing a comparator-net and reorder-net based combiner to improve handwriting recognition. In one form, the process of FIG. 8 is at least partially implemented in the operating logic of computing device 600 (described in FIG. 11). The procedure begins at start point 450 with providing a comparator-net based combiner that simplifies the decision process by looking at a pair of alternates (stage 452). Using features related to each pair, the system decides which one is better (stage 454). Once trained, the comparator-net is plugged in at runtime to make a recognition decision (stage 456). In one implementation, the system plugs in a sorting algorithm to sort the alternate list proposed by multiple base recognizers and combines/unions them together (stage 456). In another implementation, instead of using a sort, a voting process between pairs is used to determine which pair had the most wins. The system uses the comparator-net combiner to improve a handwriting recognition operation (stage 458). The process ends at end point 460.

Figure 9:
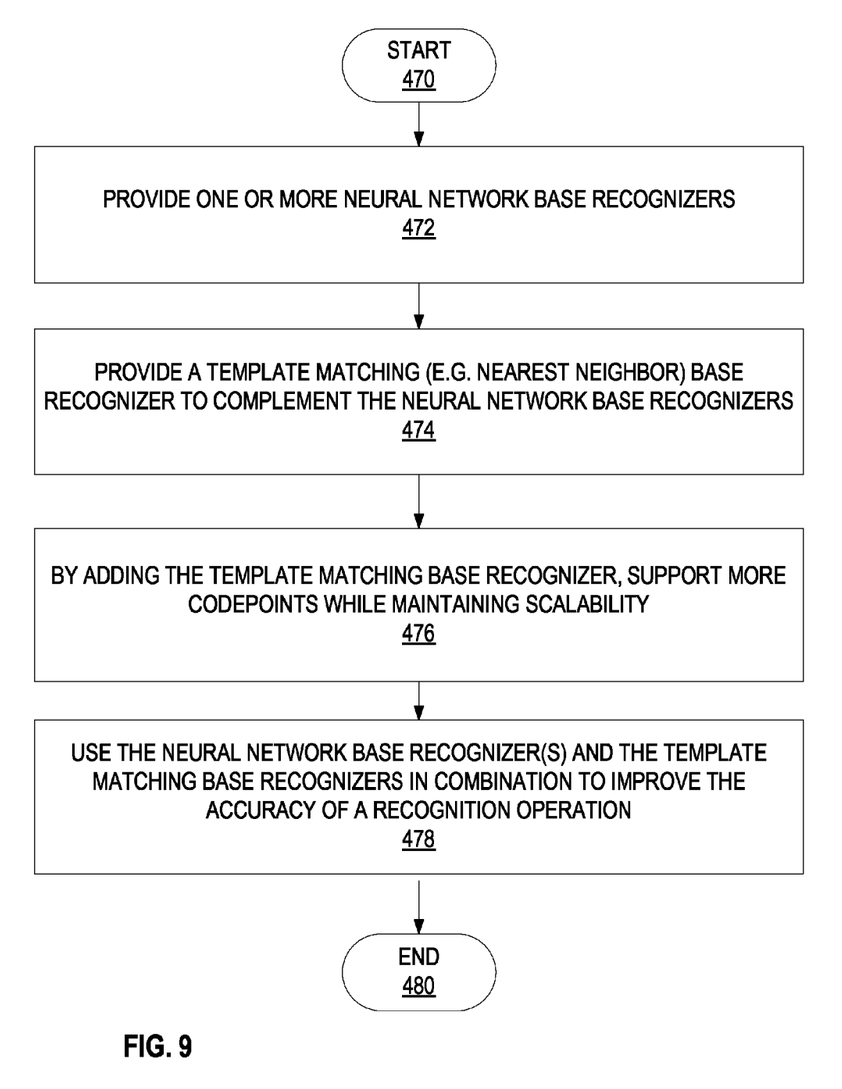
FIG. 9 is a process flow diagram for one implementation of the system of FIG. 1 and FIG. 4 that illustrates the stages involved in adding a template matching (or nearest neighbor) base recognizer in addition to neural network recognizers to improve scalability.

FIG. 9 is a process flow diagram for one implementation of the system of FIG. 1 and FIG. 4 that illustrates the stages involved in adding a template matching (or nearest neighbor) base recognizer in addition to neural network recognizers to improve scalability. In one form, the process of FIG. 9 is at least partially implemented in the operating logic of computing device 600 (described in FIG. 11). The procedure begins at start point 470 with providing one or more neural network base recognizers (stage 472). A template matching (e.g. nearest neighbor) base recognizer is used to complement the neural network base recognizer(s) (stage 474). By adding the template matching base recognizer, more codepoints can be supported while maintaining system scalability (stage 476). The neural network base recognizer(s) and the template matching base recognizers are used in combination to improve the accuracy of a recognition operation (stage 478). The process ends at end point 480.

Figure 10:
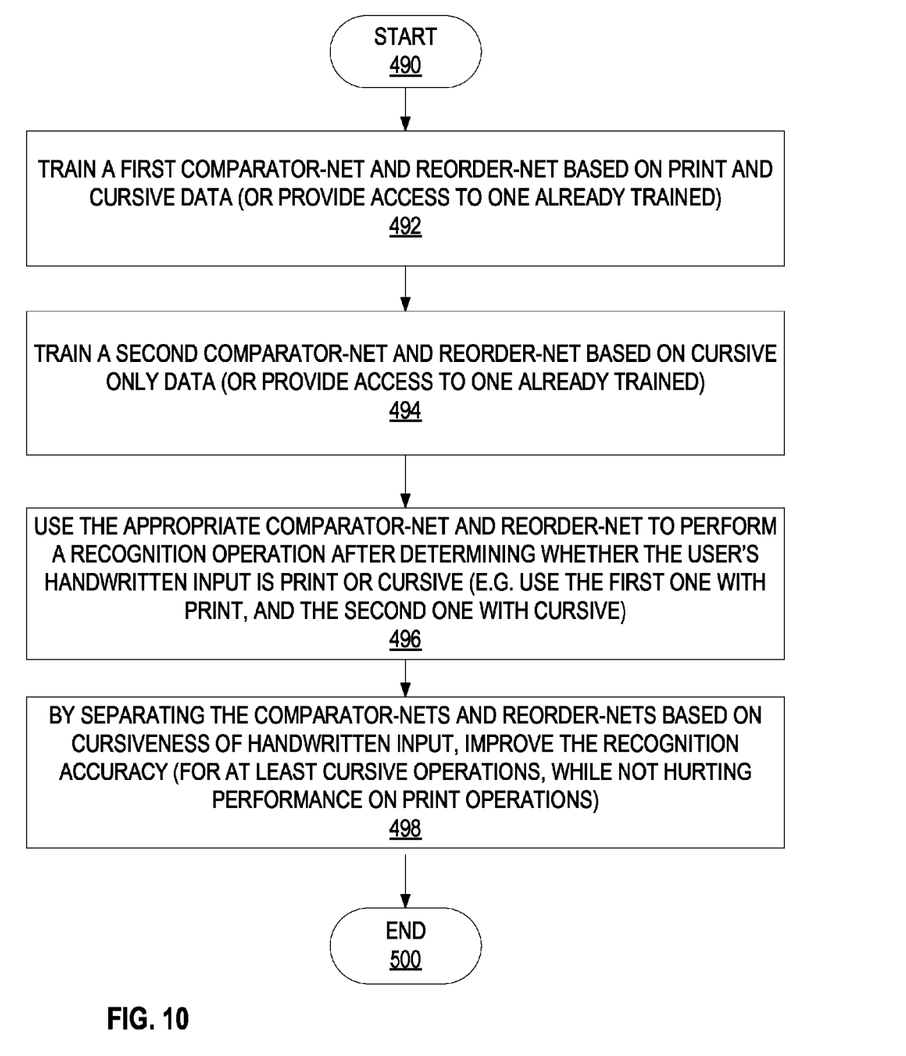
FIG. 10 is a process flow diagram for one implementation of the system of FIG. 1 and FIG. 4 that illustrates the stages involved in providing a hierarchical combiner architecture based on the cursiveness of the ink.

FIG. 10 is a process flow diagram for one implementation of the system of FIG. 1 and FIG. 4 that illustrates the stages involved in providing a hierarchical combiner architecture based on the cursiveness of the ink. In one form, the process of FIG. 10 is at least partially implemented in the operating logic of computing device 600 (described in FIG. 11). The procedure begins at start point 490 with training a first comparator-net and reorder-net based on print and cursive data, or providing access to one already trained (stage 492). A second comparator-net and reorder-net are trained based on cursive only data, or access is provided to one already trained (stage 494). The system uses the appropriate comparator-net and reorder-net processes to perform a recognition operation after determining whether the user's handwritten input is print or cursive (e.g. use the first one with print, and the second one with cursive) (stage 496). By separating the comparator-nets and reorder-nets based on cursiveness of handwritten input, the recognition accuracy is improved. In one implementation, the recognition accuracy is improved for at least cursive operations, while not hurting performance on print operations (stage 498). The process ends at end point 500.

As shown in FIG. 11, an exemplary computer system to use for implementing one or more parts of systems described herein includes a computing device, such as computing device 600 (described in FIG. 11). In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 11 by dashed line 606.

Additionally, device 600 may also have additional features/functionality. For example, device 600 may also include additional storage (removable and/or non-removable) including, but not limited to, magnetic or optical disks or tape. Such additional storage is illustrated in FIG. 11 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 600. Any such computer storage media may be part of device 600.

Computing device 600 includes one or more communication connections 614 that allow computing device 600 to communicate with other computers/applications 615. Device 600 may also have input device(s) 612 such as keyboard, mouse, pen, voice input device, touch input device, etc. Output device(s) 611 such as a display, speakers, printer, etc. may also be included. These devices are well known in the art and need not be discussed at length here. In one implementation, computing device 600 includes Handwriting Recognition application 700. Handwriting recognition application 700 can perform some or all of the various techniques described herein in FIGS. 1-10. However, it will be understood that handwriting recognition application 700 can alternatively or additionally be embodied as computer-executable instructions on one or more computers and/or in different variations than shown on FIG. 11. Alternatively or additionally, one or more parts of handwriting recognition application 700 can be part of system memory 604, on other computers and/or applications 615, or other such variations as would occur to one in the computer software art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for improving operation of handwriting recognizers comprising:

providing at least one neural network base recognizer;

providing a template matching base recognizer to complement the at least one neural network base recognizer;

using the template matching base recognizer to generate a first alternate list based on recognizing a handwritten input;

using each of the at least one neural network base recognizer to generate a respective second alternate list based on recognizing the handwritten input;

forming a unique alternate list consisting of a union of alternates from the first alternate list and each of the at least one respective second alternate list; and improving a recognition operation based on using the unique alternate list and stored weights associated with pairs of alternates from the unique alternate list to sort the unique alternate list.

2. The method of claim 1, wherein the recognition operation is improved by an accuracy of results.

3. The method of claim 1, wherein the at least one neural network base recognizer comprises a plurality of neural network base recognizers.

4. The method of claim 1, wherein the template matching base recognizer is designed to work with a handwritten input of less than four strokes.

5. The method of claim 1, wherein the step of using the template matching base recognizer to generate a first alternate list based on recognizing a handwritten input improves the recognition operation by providing support for more codepoints than the method without the step of using the template matching base recognizer to generate a first alternate list based on recognizing a handwritten input.

6. The method of claim 5, wherein the recognition operation is further improved by the providing support for more codepoints while maintaining system scalability.

7. The method of claim 1, wherein the improving a recognition operation based on using the unique alternate list further comprises:

determining whether the handwritten input is print or cursive;

when the handwritten input is determined to be cursive:

performing a first comparator net process to reorder the unique alternate list,         performing a first reorder net process on the reordered unique alternate list, and         determining recognition results based on results of the first comparator net process and the first reorder net process; and     when the handwritten input is determined to be print:

performing a second comparator net process to reorder the unique alternate list,         performing a second reorder net process on the reordered unique alternate list, and         determining recognition results based on results of the second comparator net process and the second reorder net process.

8. The method of claim 7, wherein:

the first reorder net process and the second reorder net process compare a top two results in the reordered unique alternate list and sometimes flip an order of the top two results with respect to the cursive handwritten input and the print handwritten input, respectively.

9. A computer-readable recording medium having computer-executable instructions for causing a computer to perform a method, the computer-readable recording medium being a medium selected from a group of media consisting of a RAM, a ROM, an EEPROM, a flash memory, an optical storage medium, and a magnetic storage device, the method comprising:

providing at least one neural network base recognizer;

providing a template matching base recognizer to complement the at least one neural network base recognizer;

using the template matching base recognizer to generate a first alternate list based on recognizing a handwritten input;

using each of the at least one neural network base recognizer to generate a respective second alternate list based on recognizing the handwritten input;

forming a unique alternate list consisting of a union of alternates from the first alternate list and each of the at least one respective second alternate list; and     improving a recognition operation based on using the unique alternate list and stored weights associated with pairs of alternates from the unique alternate list to sort the unique alternate list.

10. The computer-readable recording medium of claim 9, wherein the using of the template matching base recognizer provides support for more codepoints than the method without the using of the template matching base recognizer while maintaining system scalability.

11. The computer-readable recording medium of claim 9, wherein the at least one neural network base recognizer comprises a plurality of neural network base recognizers.

12. The computer-readable recording medium of claim 9, wherein the template matching base recognizer is designed to work with a handwritten input of less than four strokes.

13. The computer-readable recording medium of claim 9, wherein the improving a recognition operation based on using the unique alternate list further comprises:

determining whether the handwritten input is print or cursive;

when the handwritten input is determined to be cursive:

performing a first comparator net process to reorder the unique alternate list,         performing a first reorder net process on the reordered unique alternate list, and         determining recognition results based on results of the first comparator net process and the first reorder net process; and     when the handwritten input is determined to be print:

performing a second comparator net process to reorder the unique alternate list,         performing a second reorder net process on the reordered unique alternate list, and         determining recognition results based on results of the second comparator net process and the second reorder net process.

14. The computer-readable recording medium of claim 9, wherein:

the first reorder net process and the second reorder net process compare a top two results in the reordered unique alternate list and sometimes flip an order of the top two results with respect to the cursive handwritten input and the print handwritten input, respectively.

15. A computing device comprising:

a processing unit; and a memory having instructions for the processing unit to perform a method, the method comprising:

providing at least one neural network base recognizer;

providing a template matching base recognizer to complement the at least one neural network base recognizer;

using the template matching base recognizer to generate a first alternate list based on recognizing a handwritten input;

using each of the at least one neural network base recognizer to generate a respective second alternate list based on recognizing the handwritten input;

forming a unique alternate list consisting of a union of alternates from the first alternate list and each of the at least one respective second alternate list; and         improving an accuracy of a recognition operation based on using the unique alternate list and stored weights associated with pairs of alternates from the unique alternate list to sort the unique alternate list.

16. The computing device of claim 15, wherein the using of the template matching base recognizer provides support for more codepoints than the method without the using of the template matching base recognizer while maintaining system scalability.

17. The computing device of claim 15, wherein the at least one neural network base recognizer comprises a plurality of neural network base recognizers.

18. The computing device of claim 15, wherein the template matching base recognizer is designed to work with a handwritten input of less than four strokes.

19. The computing device of claim 15, wherein the improving a recognition operation based on using the unique alternate list further comprises:

determining whether the handwritten input is print or cursive;

when the handwritten input is determined to be cursive:
performing a first comparator net process to reorder the unique alternate list,
performing a first reorder net process on the reordered unique alternate list, and
determining recognition results based on results of the first comparator net process and the first reorder net process; and when the handwritten input is determined to be print:
performing a second comparator net process to reorder the unique alternate list,
performing a second reorder net process on the reordered unique alternate list, and
determining recognition results based on results of the second comparator net process and the second reorder net process.

20. The computing device of claim 15, wherein:
the first reorder net process and the second reorder net process compare a top two results in the reordered unique alternate list and sometimes flip an order of the top two results with respect to the cursive handwritten input and the print handwritten input, respectively.

* * * * *